Sept. 28, 1965    T. NEWBOLD ETAL    3,208,135
METHOD OF ASSEMBLING A PLUG FASTENER DEVICE
Filed Feb. 28, 1963    2 Sheets-Sheet 1
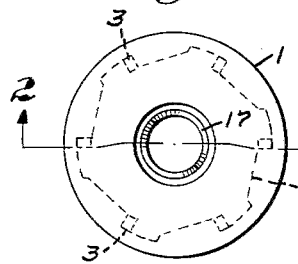
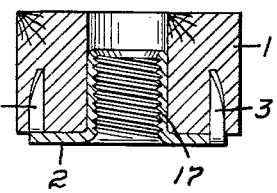
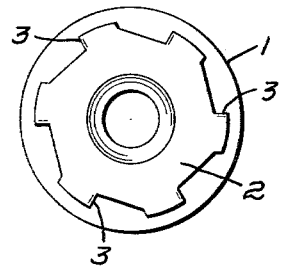
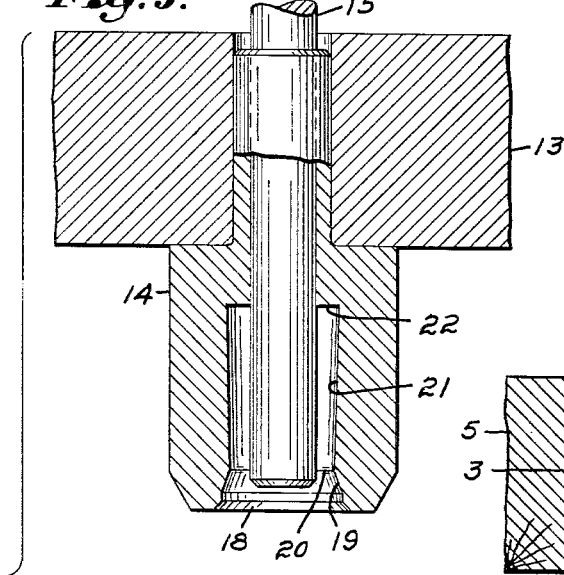
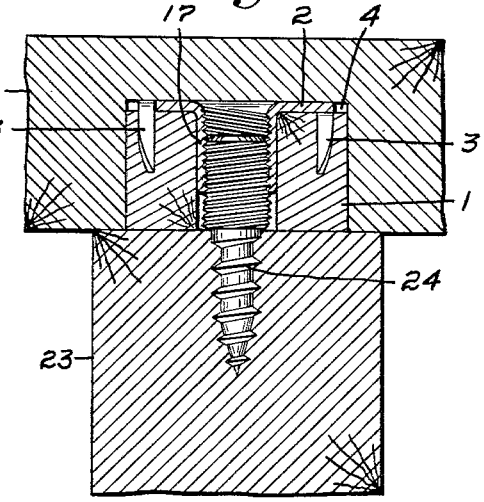
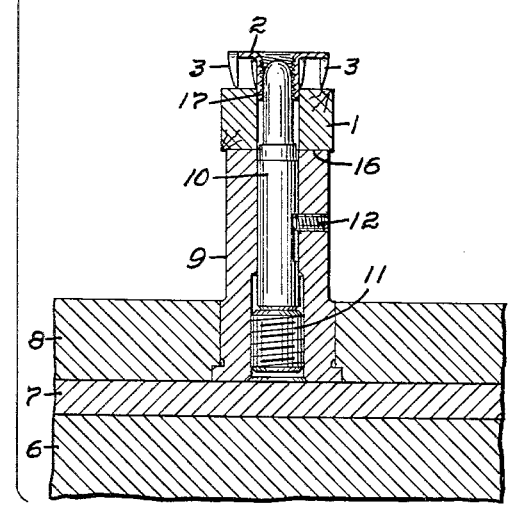
Inventor:
Thomas Newbold &
Harold S. van Buren Jr.
by Walter P. Jones
Att'y.

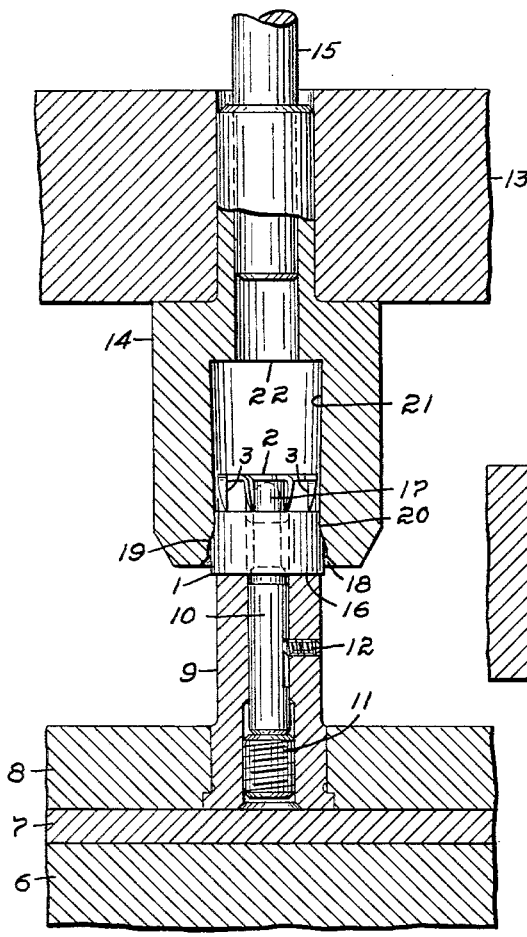
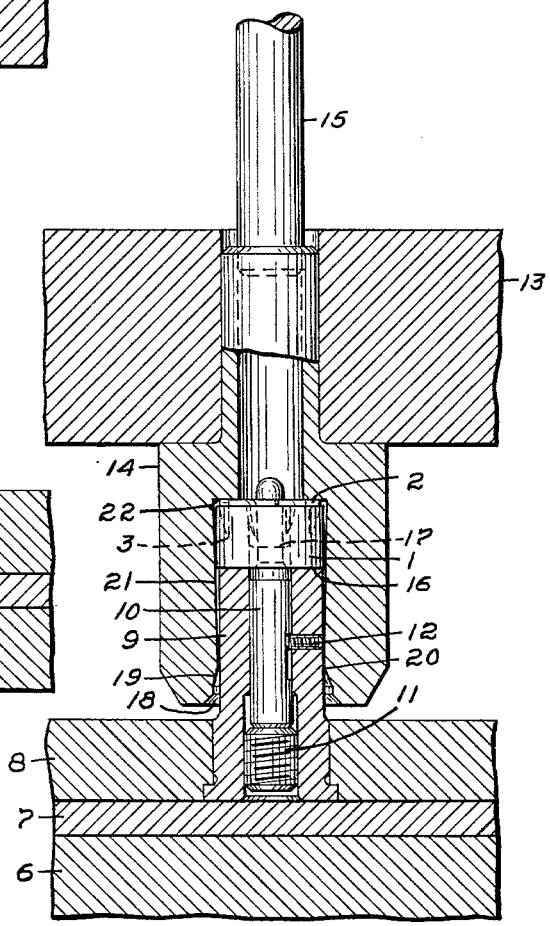

United States Patent Office 3,208,135
Patented Sept. 28, 1965

3,208,135
METHOD OF ASSEMBLING A PLUG FASTENER DEVICE
Thomas Newbold, Lincoln, and Harold S. van Buren, Jr., Cambridge, Mass., assignors to United-Carr Incorporated, a corporation of Delaware
Filed Feb. 28, 1963, Ser. No. 261,794
1 Claim. (Cl. 29—432)

This invention relates to fastener devices for joining two members such as parts of furniture, cabinets, and the like, and to the method of making the fastener devices.

An object of the invention is to provide a fastener device having a plug member and a fastener member assembled therewith wherein the plug member is compressed to reduce its outer diameter so that, when it is placed in a hole, it will be expanded after moistening, to become tightly fitted into and retained in the hole.

Another object of the invention is involved in the method of preparing the improved plug fastener device by compressing the plug member in a suitable set of tools and also to assemble a fastener member with the plug member by the same set of tools and preferably to attach the fastener member to the plug member after the plug member is compressed.

In the drawings:

FIG. 1 is a plan view of an improved plug fastener member;

FIG. 2 is a section taken on the line 2—2 of FIG. 1;

FIG. 3 is a bottom view of the device shown in FIG. 1;

FIG. 4 is a view showing a joint (such as the joint between a tabletop and a leg) in cross-section showing one use of the improved plug fastener device;

FIG. 5 is a view of one type of tool member for compressing the plug member and attaching the fastener member thereto, the plug member and fastener member being in position on the lower die;

FIG. 6 is a view similar to FIG. 5 showing the tools in operation and the plug member partially compressed; and FIG. 7 is a view similar to FIG. 5 showing the relationship of the parts upon completion of the assembly of the plug and fastener members.

The particular plug fastening device illustrated by the drawings includes (FIGS. 1, 2, and 3) a plug member 1 and a hollow threaded nut member 2 secured to the plug member by any suitable number of attaching prongs 3. Any other suitable fastener member, such as a snap fastener stud, a bolt, or other suitable member, may be used instead of the nut member 2.

It is known that a similar device has been used but without a compressed plug member and it is the use of a compressed plug member that is new and results in a better holding fastener device when applied in a hole in a support. The known plug fasteners were cemented into holes but they did not always hold well because the glue joint was not set up under pressure. The new device is better because the release of the compression which is triggered by application of moisture gives a pressurized glue joint which is far superior because the pressure forces the glue (cement) into the pores of the dowel and the supporting member.

The present invention overcomes the deficiencies of the previous construction by providing a plug member 1 made of wood or some other compressible material that is compressed laterally from a size larger than the hole in which it is used to a size to fit loosely into a hole 4 in a part 5 as shown in FIG. 4. In this case the compressed plug member 1 is provided on its outer periphery with a water-base cement or other moistening liquid and then placed in the hole 4. The cement or glue may be placed in the hole first, if desired. In any event, because of the initial loose fit, there is no scraping off of the cement as was the case in previous devices. The moisture then causes the compressed peripheral portion of the plug to expand quickly toward its original diameter thereby tightly engaging the material of the support 5 surrounding the hole 4. In this case there had been found that the expansion is such that any normal dry out or shrinkage at the joint is taken care of by the expansion and the plug members cannot be loosened by any normal stresses and strains exerted at the joint.

It has been found that wooden plugs serve the best purpose of the invention but other compressible materials, that will expand when moisture is applied, will work just as satisfactorily. The previously known devices were also unsatisfactory because, when made of wooden dowels, they had a tendency to split when the prongs of the nut device were driven into the plug. The rejects from this trouble were serious and costly.

With the present device a new method of assembly has resulted in overcoming splitting and has provided a simple, inexpensive method of compressing and assembling.

The improved method is shown in FIGS. 5, 6, and 7 by a set of tools operable toward and away from each other. While various forms of tools may provide the desired results those illustrated have proved satisfactory. Any type of assembly press may be used but as an example there are shown only those parts of the press and tools that are necessary for a complete understanding of the method by anyone skilled in the art. In the drawings there are shown (FIG. 5) a bolster plate 6, wear plate 7, a tool holder plate 8, and a lower fastener device supporting tool 9. This tool 9 has an adjustable pin 10 which may be moved up and down within the tool 9 by the adjusting screw 11 to take care of various thicknesses of wooden plugs. When the proper adjustment of the pin 10 is made it is held in that position by a set screw 12.

In the tools there is also included a punch plate 13, movable toward the bolster plate 6 and carrying an upper tool 14. In the drawings a knockout pin 15 is stationary as by being attached to a fixed part of the machine or tools. This knockout pin 15 may be operated by a compression spring or by cam means; neither of which is shown because such a device is well understood in the art.

To assemble the wooden plug member 1 with the pronged nut member 2 the parts are placed over the pin 10 so that the plug 1 rests on the upper face 16 of the tool 9 and the threaded barrel 17 of the nut 2 fits over the pin 10 with the prongs 3 resting upon the upper end of the plug 1 as shown in FIG. 5.

Thereafter the upper tool 14 is moved downwardly and the fastener parts enter an axial bore in the tool 14 as shown in FIG. 6. The entrance portion 18 of the bore of the tool 14 is large enough to readily receive the nut 2 and plug 1 and beyond this provided an inwardly tapering wall portion 19 which terminates in a junction point 20 with the remainder of the bore of the tool 14 to provide proper diameter for the required size of the plug member 1. Thereafter the wall portion 21 surrounding the bore tapers outwardly slightly for purposes hereinafter to be described. Thus it will be seen by an inspection of FIG. 6 that, as the plug member 1 enters the bore of the upper tool 14 the wall portion 19 gradually compresses the material of the plug member to reduce its diameter to that of the controlling point at the junction point 20. Thereafter as the downward movement of the tool 14 continues the plug member 1 is entirely reduced in diameter throughout its length, and the nut member 2 engages the shoulder 22 at the top end of the bore so that, as the tool 14 continues downwardly, the prongs 3 of the nut 2 will be driven into the material of the plug member 1 and the barrel 17 enters into a hole in the plug 1 thereby completing the assembly as shown in FIG. 7.

The wall 21 may be slightly tapered, as shown, or it map be straight, if desired; but in any event the relative diameter of the wall 21 and the outer diameter of the plug 1 is such that the material of the plug member 1 cannot be expanded enough to split while the prongs 3 are being driven into the plug.

If there is any slight expansion of the peripheral wall of the plug member 1 by the prongs 3 when driven into place that expansion is "ironed out" and the proper compressed diameter is restored when the assembled device passes by the reducing punction point 20, on its way out of the bore in the upper tool, so that when the tools return from the position shown in FIG. 7 to the position shown in FIG. 5 the assembled device will rest on the lower tool and may be removed therefrom by air, hand, or any other suitable manner.

The plug member is now ready for use and it will be apparent that this improved compressed plug member is particularly desirable because it may be fitted into the hole 4, after the cement or other moisture is applied, with relative ease, and without wiping off the cement, because the hole may be of a diameter that is slightly larger than the plug 1. The plug will be expanded and cemented into place by the swelling action that takes place, due to releasing of the compression because the moisture of the cement or other swelling liquid, so that an exceptionally strong joint is made between the plug member 1 and the supporting part 5. The plug fastener is placed in the hole 4 with the nut on top rather than on the bottom because it provides a stronger arrangement of the parts.

Thereafter a leg member 23 may be attached to the supporting part 5 by the use of a suitably shaped and threaded screw member 24 which is threaded into the leg and then threaded into the barrel 17 of the nut member 2 (or in a reverse manner) as shown in FIG. 4.

While there has been illustrated and described one particular form of plug fastener member with a compressed plug member and a particular tool arrangement for compressing the plug and assembling a fastener therewith by a new and improved method it should be understood that the invention with respect to the plug fastener member and the method of making and assembling the same is best defined by the following claim.

We claim:

The method of making a plug fastener device, having a hollow plug member and a pronged fastener member secured thereto, wherein said fastener member includes an axially extending threaded barrel portion having a radial flange portion at one end thereof provided with a plurality of prongs extending in the direction of said barrel portion, which comprises placing the fastener and plug members between suitable tools for assembling the members and compressing the plug member and thereafter moving the tools toward each other and thereby radially compressing the plug member and assembling the fastener member thereto during the operation of moving the tools toward each other, the plug member first being compressed radially inwardly throughout substantially its entire circumferential extent and, while held in compression by the tools, simultaneously driving the threaded barrel portion into the hollow of the plug member and driving the prongs into the compressed portion of the plug member to prevent splitting of the plug member by the prongs of the fastener.

References Cited by the Examiner

UNITED STATES PATENTS

| | | | |
|---|---|---|---|
| 101,315 | 3/70 | Sanders | 144—284 |
| 1,687,207 | 10/28 | Hawker | 144—284 |
| 2,102,558 | 12/37 | Johnson | 151—41.73 |
| 2,217,026 | 10/40 | Nickerson | 1—326 |
| 2,584,133 | 2/52 | Koochembere | 1—326 |

EDWARD C. ALLEN, *Primary Examiner.*